(12) United States Patent
Norton et al.

(10) Patent No.: US 10,525,595 B2
(45) Date of Patent: Jan. 7, 2020

(54) METHODS, APPARATUS, COMPUTER PROGRAMS, AND NON-TRANSITORY COMPUTER READABLE STORAGE MEDIUMS FOR CONTROLLING AT LEAST ONE OF A FIRST ROBOT AND A SECOND ROBOT TO COLLABORATE WITHIN A SYSTEM

(71) Applicant: ROLLS-ROYCE plc, London (GB)

(72) Inventors: Andrew D Norton, Derby (GB); James Kell, Derby (GB); Dragos A Axinte, Derby (GB)

(73) Assignee: ROLLS-ROYCE plc, London (GB)

( * ) Notice: Subject to any disclaimer, the term of this patent is extended or adjusted under 35 U.S.C. 154(b) by 239 days.

(21) Appl. No.: 15/617,512

(22) Filed: Jun. 8, 2017

(65) Prior Publication Data

US 2018/0009109 A1    Jan. 11, 2018

(30) Foreign Application Priority Data

Jul. 8, 2016   (GB) .................................. 1611883.8

(51) Int. Cl.
*G05B 19/418*    (2006.01)
*B25J 9/16*    (2006.01)

(52) U.S. Cl.
CPC ........... *B25J 9/1682* (2013.01); *B25J 9/1697* (2013.01); *G05B 2219/39146* (2013.01)

(58) Field of Classification Search
None
See application file for complete search history.

(56) References Cited

U.S. PATENT DOCUMENTS

| 4,836,742 | A |   | 6/1989 | Ishiguro et al. |
| 5,825,981 | A | * | 10/1998 | Matsuda .......... G05B 19/41815 700/248 |
| 5,956,465 | A | * | 9/1999 | Takagi ............. G05B 19/41815 700/178 |
| 6,434,448 | B1 | * | 8/2002 | Kosaka ................. B25J 9/1674 318/568.11 |

(Continued)

FOREIGN PATENT DOCUMENTS

| EP | 2221151 A2 * | 8/2010 | ............ B25J 9/0084 |
| EP | 2298507 A1 * | 3/2011 | .............. B25J 5/007 |

(Continued)

OTHER PUBLICATIONS

Dec. 19, 2016 Search Report issued in British Patent Application No. 1611883.8.

(Continued)

*Primary Examiner* — Bhavesh V Amin
(74) *Attorney, Agent, or Firm* — Oliff PLC

(57) ABSTRACT

A method of controlling at least one of a first robot and a second robot to collaborate within a system, the first robot and the second robot being physically separate to one another, the method including: receiving sensed data associated with the second robot; determining position and/or orientation of the second robot using the received sensed data; determining an action for the second robot using the determined position and/or orientation of the second robot; and providing a control signal to the second robot to cause the second robot to perform the determined action to collaborate with the first robot.

19 Claims, 4 Drawing Sheets

(56) References Cited

U.S. PATENT DOCUMENTS

| | | | |
|---|---|---|---|
| 8,958,911 B2* | 2/2015 | Wong | G05D 1/024 |
| | | | 700/258 |
| 8,972,059 B2 | 3/2015 | Moriyama et al. | |
| 9,086,694 B2* | 7/2015 | Ha | B25J 9/161 |
| 9,329,597 B2* | 5/2016 | Stoschek | G05D 1/021 |
| 9,519,058 B1* | 12/2016 | Freeman | G01S 17/023 |
| 9,910,436 B1* | 3/2018 | Li | G05D 1/021 |
| 2002/0029095 A1* | 3/2002 | Kosaka | B25J 9/1674 |
| | | | 700/245 |
| 2003/0228035 A1* | 12/2003 | Parunak | G01S 5/0263 |
| | | | 382/107 |
| 2004/0030448 A1* | 2/2004 | Solomon | F41H 13/00 |
| | | | 700/245 |
| 2004/0030449 A1* | 2/2004 | Solomon | B64C 39/024 |
| | | | 700/245 |
| 2004/0030570 A1* | 2/2004 | Solomon | F41G 3/04 |
| | | | 700/248 |
| 2004/0030571 A1* | 2/2004 | Solomon | F41H 13/00 |
| | | | 700/248 |
| 2004/0068351 A1* | 4/2004 | Solomon | F41H 13/00 |
| | | | 701/24 |
| 2004/0068415 A1* | 4/2004 | Solomon | F41H 13/00 |
| | | | 89/1.11 |
| 2004/0068416 A1* | 4/2004 | Solomon | F41H 13/00 |
| | | | 446/454 |
| 2004/0162638 A1* | 8/2004 | Solomon | F41H 13/00 |
| | | | 700/247 |
| 2005/0273199 A1 | 12/2005 | Ban et al. | |
| 2006/0079997 A1* | 4/2006 | McLurkin | G05D 1/0297 |
| | | | 700/245 |
| 2006/0287769 A1 | 12/2006 | Yanagita et al. | |
| 2007/0250212 A1* | 10/2007 | Halloran | A47L 5/30 |
| | | | 700/245 |
| 2009/0012647 A1 | 1/2009 | Kamiya | |
| 2009/0070281 A1* | 3/2009 | Solomon | G06N 3/12 |
| | | | 706/13 |
| 2009/0089035 A1* | 4/2009 | Solomon | B82Y 10/00 |
| | | | 703/11 |
| 2010/0262287 A1* | 10/2010 | Ha | B25J 9/161 |
| | | | 700/248 |
| 2013/0211658 A1* | 8/2013 | Bonefas | B65G 67/24 |
| | | | 701/28 |
| 2013/0226344 A1* | 8/2013 | Wong | G05D 1/024 |
| | | | 700/258 |
| 2015/0205298 A1* | 7/2015 | Stoschek | G05D 1/021 |
| | | | 701/23 |
| 2015/0248120 A1 | 9/2015 | Haug et al. | |
| 2015/0283697 A1 | 10/2015 | Chang et al. | |
| 2016/0132059 A1 | 5/2016 | Mason et al. | |
| 2016/0279789 A1 | 9/2016 | Axinte et al. | |
| 2017/0080566 A1* | 3/2017 | Stubbs | B25J 9/1679 |
| 2017/0329297 A1* | 11/2017 | Gilman | F01D 5/005 |

FOREIGN PATENT DOCUMENTS

| | | | | |
|---|---|---|---|---|
| EP | 2810745 A1 | 12/2014 | | |
| EP | 3135441 A1 * | 3/2017 | | B25J 9/0084 |
| JP | 2003-159683 A | 6/2003 | | |

OTHER PUBLICATIONS

Dnews; "Robotic Arm Inspired by Elephant Trunk;" Nov. 29, 2010; Retrieved from https://www.seeker.com/robotic-arm-inspired-by-elephant-trunk-1765141414.html.

* cited by examiner

METHODS, APPARATUS, COMPUTER PROGRAMS, AND NON-TRANSITORY COMPUTER READABLE STORAGE MEDIUMS FOR CONTROLLING AT LEAST ONE OF A FIRST ROBOT AND A SECOND ROBOT TO COLLABORATE WITHIN A SYSTEM

TECHNOLOGICAL FIELD

The present disclosure concerns methods, apparatus, computer programs, and non-transitory computer readable storage mediums for controlling at least one of a first robot and a second robot to collaborate within a system.

BACKGROUND

During operation of a gas turbine engine, internal components may become worn and/or damaged over a period of time. During servicing, a borescope may be inserted into the gas turbine engine to enable an operator to inspect the internal components. Where one or more components are determined to be worn and/or damaged, the gas turbine engine may require disassembly so that the one or more components may be accessed and repaired. This may be a relatively time consuming and costly procedure.

BRIEF SUMMARY

According to various examples there is provided a method of controlling at least one of a first robot and a second robot to collaborate within a system, the first robot and the second robot being physically separate to one another, the method comprising: receiving sensed data associated with the second robot; determining position and/or orientation of the second robot using the received sensed data; determining an action for the second robot using the determined position and/or orientation of the second robot; and providing a control signal to the second robot to cause the second robot to perform the determined action to collaborate with the first robot.

The sensed data may be associated with a first end of the second robot. The first end may comprise one or more devices for performing the determined action.

The method may further comprise controlling a three dimensional scanner to obtain the sensed data.

The three dimensional scanner may be mounted on the first robot.

Controlling the three dimensional scanner may include: controlling an emitter to emit electromagnetic waves, the sensed data being received from an electromagnetic wave sensor.

Controlling the three dimensional scanner may include: controlling an ultrasonic transducer to emit ultrasonic waves, the sensed data being received from the ultrasonic transducer.

The method may further comprise controlling a magnetic transmitter arrangement to provide one or more magnetic fields, the second robot being at least partially positioned within the one or more magnetic fields, the sensed data being received from a magnetic field sensor mounted on the second robot.

Determining the action for the second robot may further comprise using stored data of the structure of the system.

The determined action may include movement relative to the system.

The determined action may include holding an object within the system to prevent movement of the object within the system.

The determined action may include obtaining one or more images of the first robot and/or the system.

The determined action may include machining an object within the system.

The method may further comprise: receiving sensed data associated with the first robot; determining position and/or orientation of the first robot using the received sensed data; determining an action for the first robot using the determined position and/or orientation of the first robot; and providing a control signal to the first robot to cause the first robot to perform the determined action to collaborate with the second robot.

According to various examples there is provided a computer program that, when read by a computer, causes performance of the method as described in any of the preceding paragraphs.

According to various examples there is provided a non-transitory computer readable storage medium comprising computer readable instructions that, when read by a computer, cause performance of the method as described in any of the preceding paragraphs.

According to various examples there is provided apparatus for controlling at least one of a first robot and a second robot to collaborate within a system, the first robot and the second robot being physically separate to one another, the apparatus comprising a controller configured to: receive sensed data associated with the second robot; determine position and/or orientation of the second robot using the received sensed data; determine an action for the second robot using the determined position and/or orientation of the second robot; and provide a control signal to the second robot to cause the second robot to perform the determined action to collaborate with the first robot.

The sensed data may be associated with a first end of the second robot. The first end may comprise one or more devices for performing the determined action.

The controller may be configured to control a three dimensional scanner to obtain the sensed data.

The three dimensional scanner may be mounted on the first robot.

The controller may be configured to control an emitter to emit electromagnetic waves, the sensed data being received from an electromagnetic wave sensor.

The controller may be configured to control an ultrasonic transducer to emit ultrasonic waves, the sensed data being received from the ultrasonic transducer.

The controller may be configured to control a magnetic transmitter arrangement to provide one or more magnetic fields, the second robot being at least partially positioned within the one or more magnetic fields, the sensed data being received from a magnetic field sensor mounted on the second robot.

Determining the action for the second robot may further comprise using stored data of the structure of the system.

The determined action may include movement relative to the system.

The determined action may include holding an object within the system to prevent movement of the object within the system.

The determined action may include obtaining one or more images of the first robot and/or the system.

The determined action may include machining an object within the system.

The controller may be configured to: receiving sensed data associated with the first robot; determining position and/or orientation of the first robot using the received sensed data; determining an action for the first robot using the determined position and/or orientation of the first robot; and providing a control signal to the first robot to cause the first robot to perform the determined action to collaborate with the second robot.

The apparatus may further comprise: the first robot including a first controller and a first actuator; and the second robot including a second controller and a second actuator.

The first robot may be a continuum robot having a first base, the first controller and the first actuator may be housed within the first base, and wherein the second robot may be a continuum robot having a second base, the second controller and the second actuator may be housed within the second base, the first base and the second base may be movable relative to one another.

The first robot and the second robot may each comprise a first end having an interface for interchangeably receiving at least a first device and a second device.

The first device may include one or more of: imaging apparatus; machining apparatus; clamping apparatus, and the second device includes one or more of:

imaging apparatus; machining apparatus; clamping apparatus.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION

Embodiments will now be described by way of example only, with reference to the Figures, in which.

DETAILED DESCRIPTION

In the following description, the terms 'connected' and 'coupled' mean operationally connected and coupled. It should be appreciated that there may be any number of intervening components between the mentioned features, including no intervening components.

Figure 1:
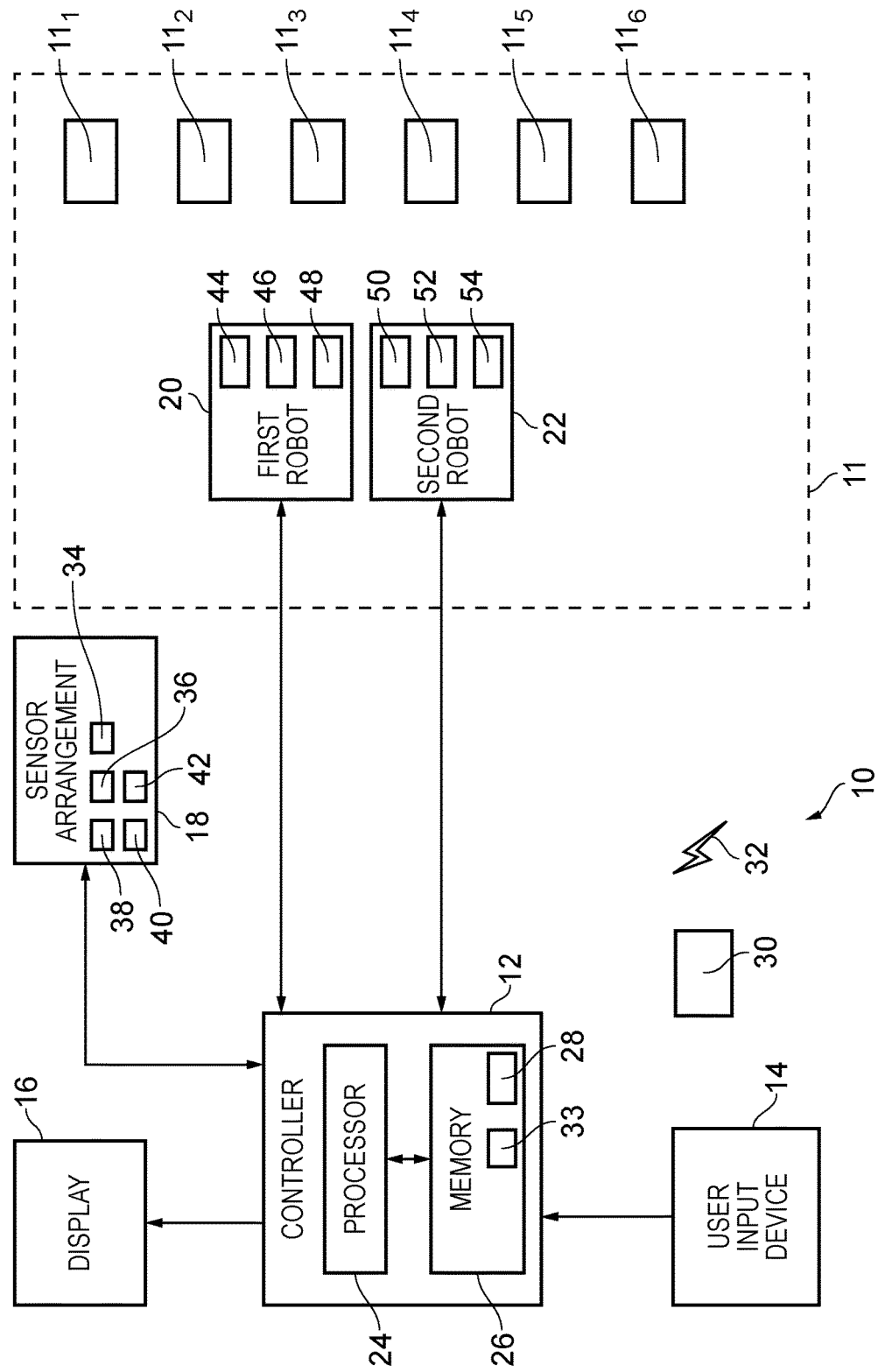
FIG. 1 illustrates a schematic diagram of apparatus according to various examples.

FIG. 1 illustrates a schematic diagram of an apparatus 10 according to various examples, and a system 11. The apparatus 10 includes a controller 12, a user input device 14, a display 16, a sensor arrangement 18, a first robot 20, and a second robot 22.

In some examples, the apparatus 10 may be a module. As used herein, the wording 'module' refers to a device or apparatus where one or more features are included at a later time and, possibly, by another manufacturer or by an end user. For example, where the apparatus 10 is a module, the apparatus 10 may only include the controller 12, and the remaining features (such as the user input device 14, the display 16, the sensor arrangement 18, the first robot 20, and the second robot 22) may be added by another manufacturer, or by an end user.

The system 11 may comprise any mechanical or electromechanical system, or may comprise part of such a system. For example, the system 11 may comprise a part, or the whole, of a gas turbine engine. By way of another example, the system 11 may comprise at least a part of a diesel engine. By way of a further example, the system 11 may comprise at least a part of an industrial generator. By way of another example, the system 11 may comprise at least a part of a nuclear reactor (such as a nuclear pressure vessel). By way of a further example, the system 11 may comprise at least a part of a thruster (such as an azimuth thruster) for a marine vessel.

The system 11 includes a plurality of objects $11_1$, $11_2$, $11_3$, $11_4$, $11_5$, $11_6$ Where the system 11 is at least a part of a gas turbine engine, the plurality of objects $11_1$, $11_2$, $11_3$, $11_4$, $11_5$, $11_6$ may be components or assemblies within the gas turbine engine. For example, the plurality of objects $11_1$, $11_2$, $11_3$, $11_4$, $11_5$, $11_6$ may include aerofoils (such as compressor or turbine blades) within a gas turbine engine.

The controller 12, the user input device 14, the display 16, the sensor arrangement 18, the first robot 20 and the second robot 22 may be coupled to one another via a wireless link and may consequently comprise transceiver circuitry and one or more antennas. Additionally or alternatively, the controller 12, the user input device 14, the display 16, the sensor arrangement 18, the first robot 20 and the second robot 22 may be coupled to one another via a wired link and may consequently comprise interface circuitry (such as a Universal Serial Bus (USB) socket). It should be appreciated that the controller 12, the user input device 14, the display 16, the sensor arrangement 18, the first robot 20 and the second robot 22 may be coupled to one another via any combination of wired and wireless links.

Figure 2:
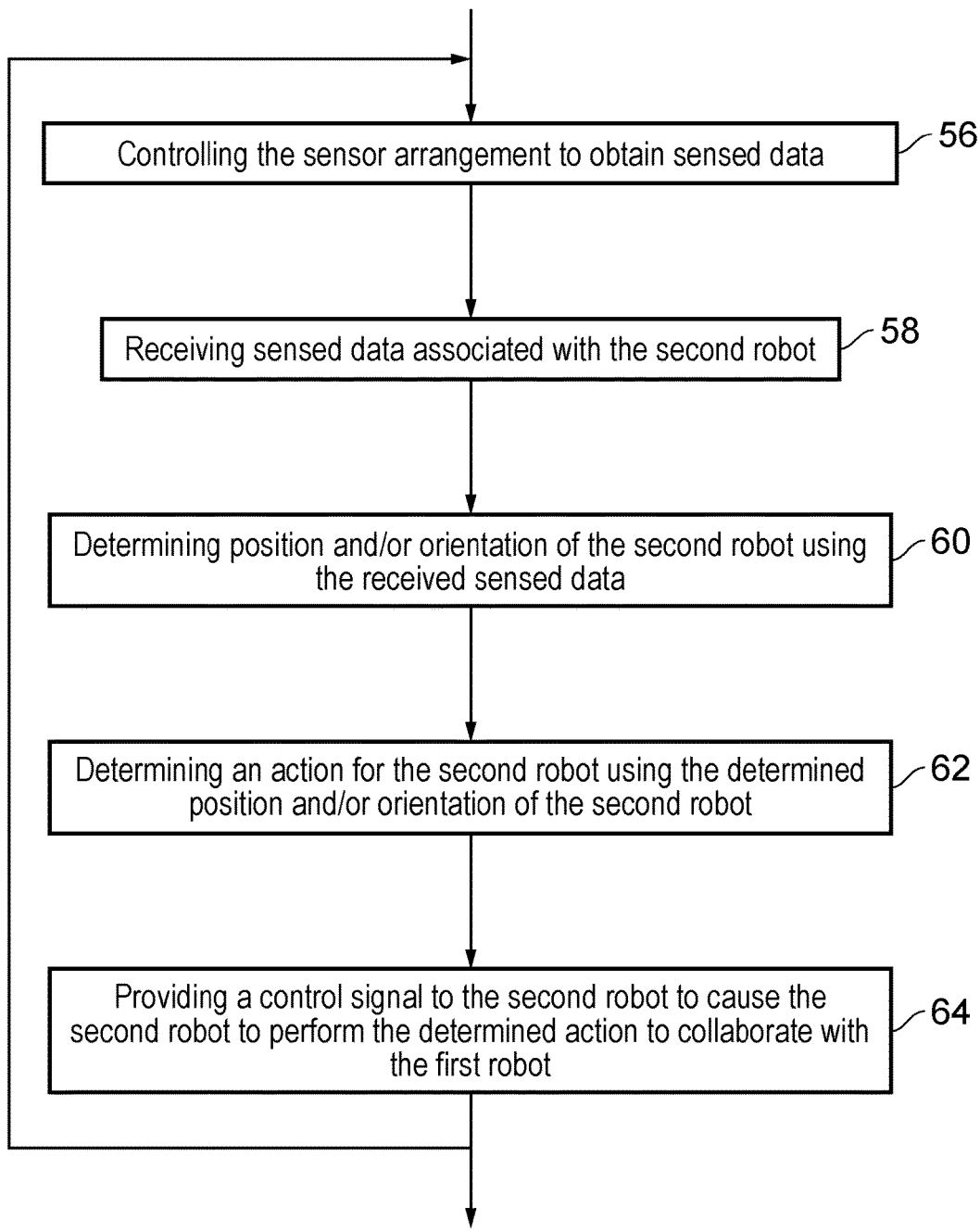
FIG. 2 illustrates a flow diagram of a method of controlling a second robot to collaborate with a first robot within a system according to various examples.
Figure 4:
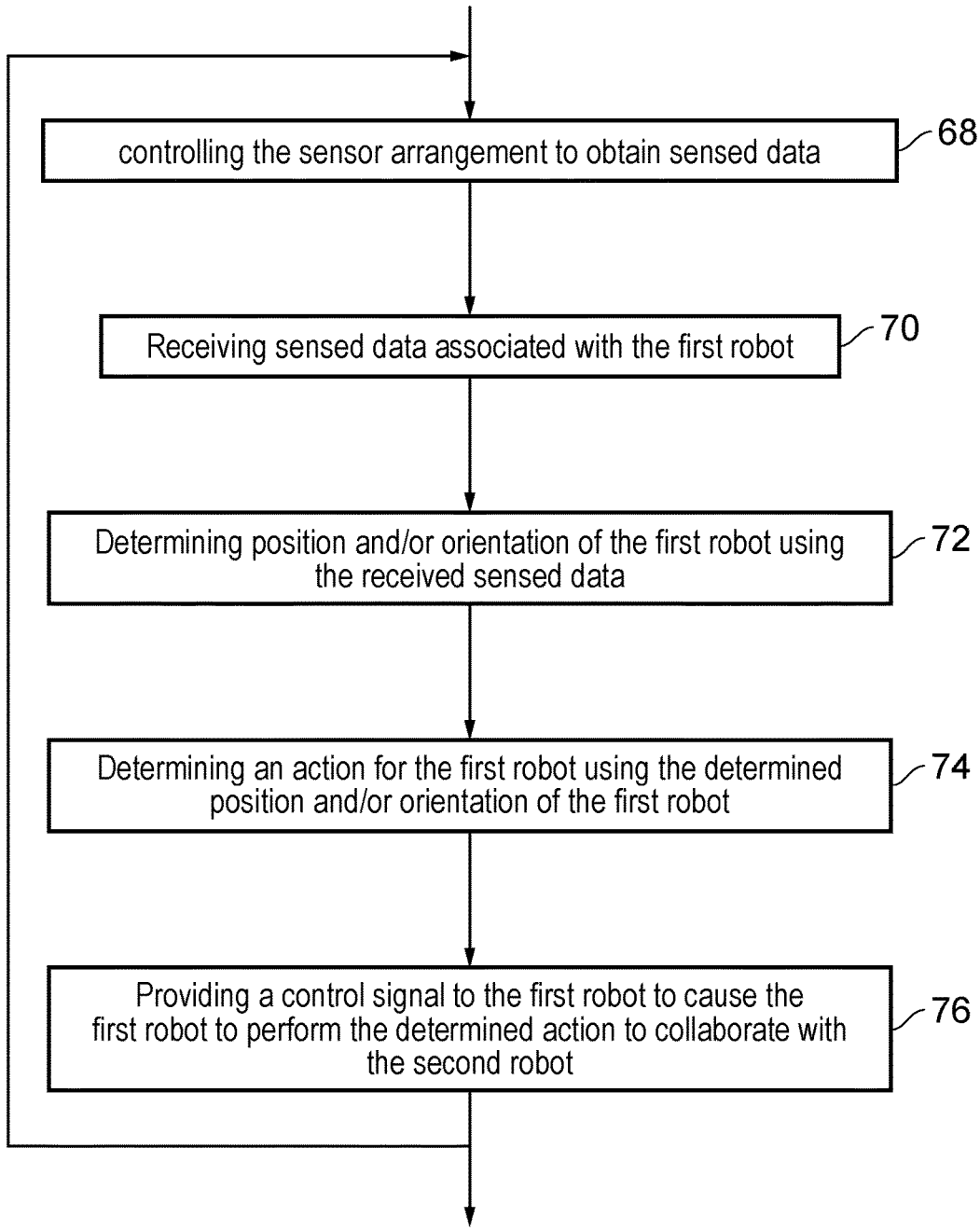
FIG. 4 illustrates a flow diagram of a method of controlling a first robot to collaborate with a second robot within a system according to various examples.

The controller 12 may comprise any suitable circuitry to cause performance of the methods described herein and as illustrated in FIGS. 2 and 4. The controller 12 may comprise: control circuitry; and/or processor circuitry; and/or at least one application specific integrated circuit (ASIC); and/or at least one field programmable gate array (FPGA); and/or single or multi-processor architectures; and/or sequential/parallel architectures; and/or at least one programmable logic controllers (PLCs); and/or at least one microprocessor; and/or at least one microcontroller; and/or a central processing unit (CPU); and/or a graphics processing unit (GPU), to perform the methods.

In various examples, the controller 12 may comprise at least one processor 24 and at least one memory 26. The memory 26 stores a computer program 28 comprising computer readable instructions that, when read by the processor 24, causes performance of the methods described herein, and as illustrated in FIGS. 2 and 4. The computer program 28 may be software or firmware, or may be a combination of software and firmware.

The processor 24 may include at least one microprocessor and may comprise a single core processor, may comprise multiple processor cores (such as a dual core processor or a quad core processor), or may comprise a plurality of processors (at least one of which may comprise multiple processor cores).

The memory 26 may be any suitable non-transitory computer readable storage medium, data storage device or devices, and may comprise a hard disk and/or solid state memory (such as flash memory). The memory 26 may be permanent non-removable memory, or may be removable memory (such as a universal serial bus (USB) flash drive or a secure digital card). The memory 26 may include: local memory employed during actual execution of the computer program; bulk storage; and cache memories which provide temporary storage of at least some computer readable or computer usable program code to reduce the number of times code may be retrieved from bulk storage during execution of the code.

The computer program 28 may be stored on a non-transitory computer readable storage medium 30. The computer program 28 may be transferred from the non-transitory computer readable storage medium 30 to the memory 26. The non-transitory computer readable storage medium 30 may be, for example, a USB flash drive, a secure digital (SD) card, an optical disc (such as a compact disc (CD), a digital versatile disc (DVD) or a Blu-ray disc). In some examples, the computer program 28 may be transferred to the memory 26 via a signal 32 (which may be a wireless signal or a wired signal).

The memory 26 also stores data 33 of the structure of the system 11. For example, where the system 11 is a part, or the whole, of a gas turbine engine, the data 33 includes data for the internal structure of the gas turbine engine. The data 33 may include one or more computer aided design (CAD) files 33 of the structure of the system 11. The data 33 may define a two dimensional (2D) structure or a three dimensional (3D) structure.

Input/output devices may be coupled to the apparatus 10 either directly or through intervening input/output controllers. Various communication adaptors may also be coupled to the controller 12 to enable the apparatus 10 to become coupled to other apparatus or remote printers or storage devices through intervening private or public networks. Non-limiting examples include modems and network adaptors of such communication adaptors.

The user input device 14 may comprise any suitable device for enabling an operator to at least partially control the apparatus 10. For example, the user input device 14 may comprise one or more of a keyboard, a keypad, a touchpad, a touchscreen display, and a computer mouse. The controller 12 is configured to receive signals from the user input device 14.

The display 16 may be any suitable display for conveying information to an operator of the apparatus 10. For example, the display 16 may be a liquid crystal display (LCD), a light emitting diode (LED) display, or an active matrix organic light emitting diode (AMOLED) display, or a thin film transistor (TFT) display, or a cathode ray tube display, and/or a loudspeaker, and/or a printer (such as an inkjet printer or a laser printer). The controller 12 is arranged to provide a signal to the display 16 to cause the display 16 to convey information to the operator.

The sensor arrangement 18 may comprise any suitable sensor or sensors for enabling the apparatus 10 to determine the position and/or orientation of at least the second robot 22 within the system 11. The sensor arrangement 18 may also comprise any suitable sensor or sensors for enabling the apparatus 10 to determine the position and/or orientation of the first robot 20 within the system 11. The sensor arrangement 18 is configured to generate sensed data and the controller 12 is configured to receive the sensed data from the sensor arrangement 18.

The sensor arrangement 18 may comprise a magnetic transmitter arrangement 34 that is configured to provide one or more magnetic fields. The system 11 and the magnetic transmitter arrangement 34 are positioned relative to one another so that at least a part of the system 11 is positioned within the one or more magnetic fields. The controller 12 is configured to control the magnetic transmitter arrangement 34 to provide the one or more magnetic fields.

The sensor arrangement 18 may include a first magnetic field sensor 36 that is mounted on the first robotic 20. The first magnetic field sensor 36 is configured to sense the magnetic field generated by the magnetic transmitter arrangement 34 and to provide the sensed magnetic field to the controller 12. In various examples, the first magnetic field sensor 36 comprises three separate conductive coils that are arranged orthogonal to one another so that the position and orientation of the first robot 20 may be determined by the controller 12.

The sensor arrangement 18 may include a second magnetic field sensor 38 that is mounted on the second robotic 22. The second magnetic field sensor 38 is configured to sense the magnetic field generated by the magnetic transmitter arrangement 34 and to provide the sensed magnetic field to the controller 12. In various examples, the second magnetic field sensor 38 comprises three separate conductive coils that are arranged orthogonal to one another so that the position and orientation of the second robot 22 may be determined by the controller 12.

The sensor arrangement 18 may include a first three dimensional scanner 40 which may be mounted on the first robot 20. The first three dimensional scanner 40 may include an emitter that is configured to emit electromagnetic waves (for example, optical light, infra-red radiation, X-rays), and an electromagnetic wave sensor (such as a charge coupled device (CCD) camera, or a complementary metal oxide semiconductor (CMOS) sensor) that is configured to receive electromagnetic waves and generate sensed data. In other examples, the first three dimensional scanner 40 may include an ultrasonic transducer that is configured to emit ultrasonic waves and to receive reflected ultrasonic waves and generate sensed data.

The sensor arrangement 18 may include a second three dimensional scanner 42 which may be mounted on the second robot 22. The second three dimensional scanner 42 may include an emitter that is configured to emit electromagnetic waves (for example, optical light, infra-red radiation, X-rays), and an electromagnetic wave sensor (such as a charge coupled device (CCD) camera, or a complementary metal oxide semiconductor (CMOS) sensor) that is configured to receive electromagnetic waves and generate sensed data. In other examples, the second three dimensional scanner 42 may include an ultrasonic transducer that is configured to emit ultrasonic waves and to receive reflected ultrasonic waves and generate sensed data.

The first robot 20 may comprise any suitable machinery for enabling inspection, and/or machining, and/or clamping of one or more of the plurality of objects $11_1$, $11_2$, $11_3$, $11_4$, $11_5$, $11_6$ within the system 11. In various examples, the first robot 20 may be a continuum robot (which may also be referred to as a 'snake' robot) that includes a base and an elongate member that extends (or is extendable from) from the base.

The first robot 20 may comprise: a first controller 44, a first actuator 46, and a first interface 48. The first controller 44 may be a 'low level controller' that is configured to receive a control signal from the controller 12 and then provide controls signals to the first actuator 46 to control the first robot 20. The first actuator 46 may include one or more servo motors (or any other suitable mechanism or mechanisms) that are configured to move the first robot 20 relative to the system 11. The first interface 48 is configured to interchangeably receive various devices. For example, the first interface 48 may be connected to, and disconnected from, an inspection device (such as a charge coupled devices (CCD) camera or complementary metal oxide semiconductor (CMOS) cameras), a machine tool, or a clamp.

The second robot 22 may comprise any suitable machinery for enabling inspection, and/or machining, and/or clamping of one or more of the plurality of objects $11_1$, $11_2$, $11_3$, $11_4$, $11_5$, $11_6$ within the system 11. In various examples, the second robot 22 may be a continuum robot (which may also be referred to as a 'snake' robot) that includes a base and an elongate member that extends (or is extendable from) from the base.

The second robot 22 may comprise: a second controller 50, a second actuator 52, and a second interface 48. The second controller 50 may be a 'low level controller' that is configured to receive a control signal from the controller 12 and then provide controls signals to the second actuator 52 to control the second robot 22. The second actuator 52 may include one or more servo motors that are configured to move the second robot 22 relative to the system 11. The second interface 54 is configured to interchangeably receive various devices. For example, the second interface 54 may be connected to, and disconnected from, an inspection device (such as a charge coupled devices (CCD) camera or complementary metal oxide semiconductor (CMOS) cameras), a machine tool, or a clamp.

It should be appreciated that the apparatus 10 may comprise any number of robots (that is, more robots than the first robot 20 and the second robot 22) that collaborate with one another. Furthermore, the apparatus 10 may comprise a plurality of subsets of robots, where each subset of robots includes a plurality of robots that collaborate with one another.

The operation of the apparatus 10 is described in the following paragraphs with reference to FIGS. 1 to 4.

Figure 3:
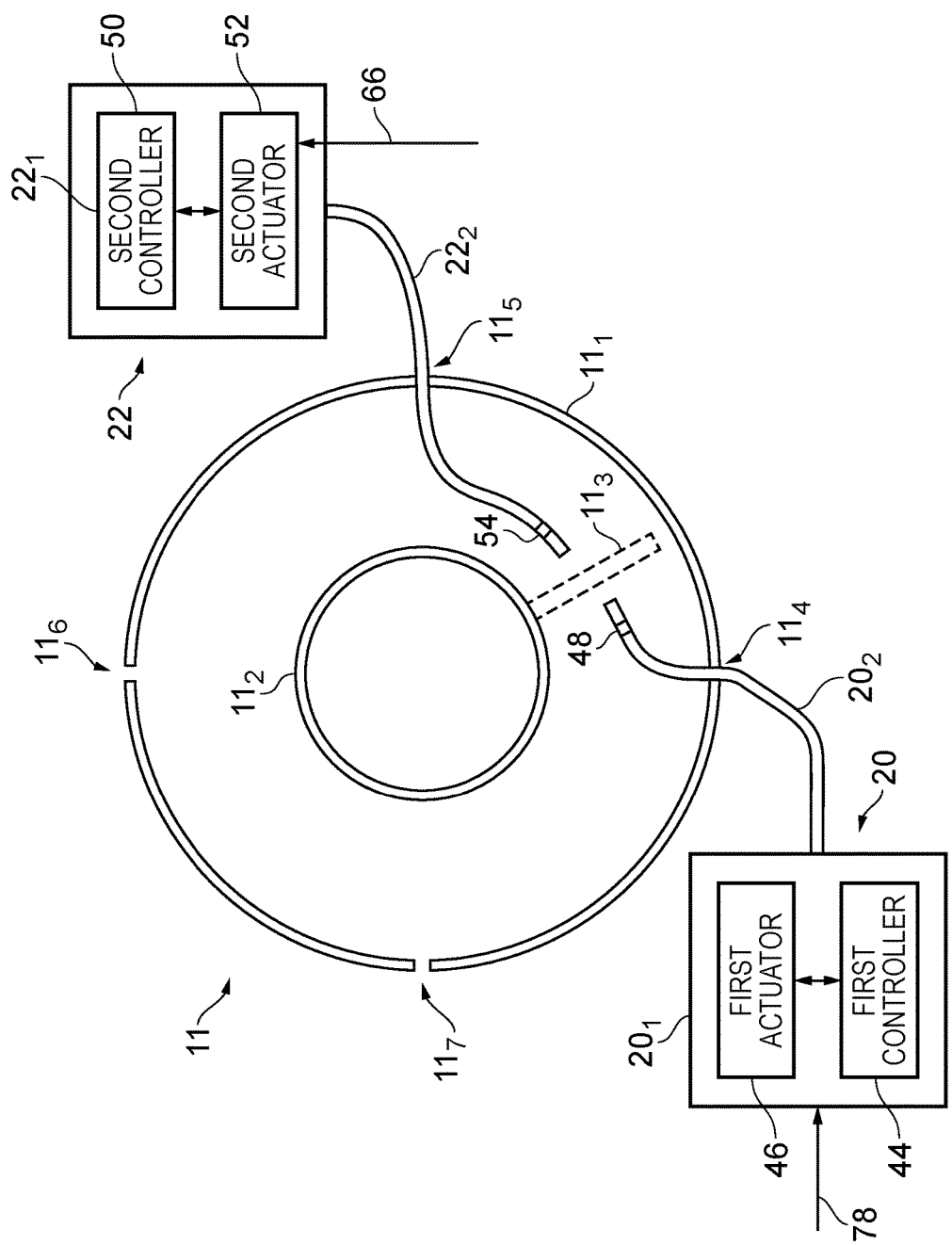
FIG. 3 illustrates a schematic cross sectional view of a gas turbine engine, a first robot, and a second robot according to various examples.

FIG. 3 illustrates a schematic cross sectional view of a gas turbine engine 11, the first robot 20, and the second robot 22 according to various examples. The gas turbine engine 11 includes a case $11_1$, a rotor $11_2$, a plurality of aerofoils $11_3$ (a single aerofoil is illustrated in FIG. 3 to maintain the clarity of the figure), a first borescope port $11_4$, a second borescope port $11_5$, a third borescope port $11_6$, and a fourth borescope port $11_7$.

The first robot 20 is a continuum robot including a base $20_1$ housing the first actuator 46 and the first controller 44. The first robot 20 also includes an elongate member $20_2$ (which may also be referred to as a snake arm) that extends from (or is extendable from) the base $20_1$. One end of the elongate member $20_2$ is coupled to the base $20_1$ and the opposite end comprises the first interface 48.

The second robot 22 is a continuum robot including a base $22_1$ housing the second actuator 52 and the second controller 50. The second robot 22 also includes an elongate member $22_2$ (which may also be referred to as a snake arm) that extends from (or is extendable from) the base $22_1$. One end of the elongate member $22_2$ is coupled to the base $22_1$ and the opposite end comprises the second interface 54.

As explained in the preceding paragraphs, the first robot 20 and the second robot 22 are physically separate from one another and consequently, the base $20_1$ of the first robot 20 may be moved relative to the base $22_1$ of the second robot 22.

As illustrated in FIG. 3, the elongate member $20_2$ of the first robot 20 has been inserted into the first borescope port $11_4$ and towards the aerofoil $11_3$, and the elongate member $22_2$ of the second robot 22 has been inserted in to the second borescope port $11_5$ and also towards the aerofoil $11_3$.

FIG. 2 illustrates a flow diagram of a method of controlling the second robot 22 to collaborate with the first robot 20 within the gas turbine engine 11 according to various examples.

At block 56 the method may include controlling the sensor arrangement 18 to obtain sensed data. For example, the controller 12 may send a control signal to the sensor arrangement 18 to obtain sensed data. Where the sensor arrangement 18 includes the magnetic transmitter arrangement 34 and the second magnetic field sensor 38 mounted on the second robot 22 (for example, the second magnetic field sensor 38 may be mounted at the end of the elongate member $22_2$ adjacent the second interface 54), the controller 12 may control the magnetic transmitter arrangement 34 to emit one or more magnetic fields. Where the sensor arrangement 18 includes the first three dimensional scanner 40 (for example, the first three dimensional scanner 40 may be mounted at the end of the elongate member $20_1$ adjacent the first interface 48), the controller 12 may control an emitter of the first three dimensional scanner 40 to emit electromagnetic waves, or ultrasonic waves towards the second robot 22.

At block 58, the method includes receiving sensed data associated with the second robot 22. The sensed data is 'associated' with the second robot 22 in that the sensed data includes information that enables the controller 12 to determine the position and/or orientation of the second robot 22.

For example, where the sensor arrangement 18 includes the second magnetic field sensor 38, the controller 12 may receive sensed data associated with the second robot 22 from the second magnetic field sensor 38. In this example, the sensed data is associated with the second robot 22 in that the sensed data is generated by the second magnetic field sensor 38 that is located on the second robot 22 and therefore includes information on the position and/or orientation of the second robot 22.

By way of another example, where the sensor arrangement 18 includes the first three dimensional scanner 40, the controller 12 may receive sensed data associated with the second robot 22 from the first three dimensional scanner 40. In this example, the sensed data is associated with the second robot 22 in that the sensed data is generated from electromagnetic waves or ultrasonic waves that are reflected from the second robot 22 and therefore includes information from which the controller 12 may determine the position and/or orientation of the second robot 22.

At block 60, the method includes determining position and/or orientation of the second robot 22 using the received sensed data. For example, where the second magnetic field sensor 38 is mounted at the end of the second robot 22 and adjacent the second interface 54, the controller 12 may use the received sensed data to determine the position and/or orientation of the end of the second robot 22. By way of another example, where the sensor arrangement 18 includes the first three dimensional scanner 40 mounted on the first robot 20, the controller 12 may use the received sensed data to determine the position and/or orientation of the second robot 22 using triangulation, time of flight, or conoscopic holography algorithms for example.

At block 62, the method includes determining an action for the second robot 22 using the determined position and/or orientation of the second robot 22. For example, an operator may use the user input device 14 to define a target location on a graphical representation of the gas turbine engine 11 displayed by the display 16 (the graphical representation may be generated from the stored data 33 of the structure of the gas turbine engine 11). The controller 12 may compare the position and/or orientation of the target location with the determined position and/or orientation of the second robot 22 to determine an action for the second robot 22.

Where the second robot 22 is not positioned at the target location, the controller 12 may determine that the second robot 22 is to move relative to the gas turbine engine 11 and towards the target location.

Where the second robot 22 is positioned close to, or at, the target location and includes a clamp connected to the second interface 54, the controller 12 may determine that the second robot 22 is to hold the aerofoil $11_3$ to prevent movement of the aerofoil $11_3$ within the gas turbine engine 11.

Where the second robot 22 is positioned close to, or at, the target location and includes a camera (such as a CCD camera or a CMOS camera), the controller 12 may determine that the camera is to be controlled to obtain one or more images of the first robot 20 and/or the gas turbine engine 11 (such as the aerofoil $11_3$).

Where the second robot 22 is positioned close to, or at, the target location and includes a machine tool, the controller 12 may determine that the machine tool is to be controlled to machine the aerofoil $11_3$ within the gas turbine engine 11.

The controller 12 may determine the action for the second robot 22 by taking into account the action being performed (or to be performed) by the first robot 20. For example, where the first robot 20 has clamped the aerofoil $11_3$, the controller 12 may then determine that the aerofoil $11_3$ is to be machined by the second robot 22.

At block 64, the method includes providing a control signal 66 to the second robot 22 to cause the second robot 22 to perform the determined action to collaborate with the first robot 20. For example, the controller 12 may generate a control signal 66 using the action determined at block 62 and then provide the control signal 66 to the second robot 22. The second controller 50 of the second robot 22 may then use the control signal 66 to control the second actuator 52 to move the second robot 22. Where the controller 12 determines at block 62 that the second robot 22 is to move and/or inspect and/or machine and/or clamp, the control signal 66 includes instructions that cause the second robot 22 to move and/or inspect and/or machine and/or clamp respectively.

It should be appreciated that the controller 12 may use the stored data 33 of the structure of the gas turbine engine 11 to generate the control signal. For example, the controller 12 may generate a movement control signal using the stored data 33 so that the elongate member $22_2$ of the second robot 22 moves towards the aerofoil $11_3$ and avoids collisions with other objects within the gas turbine engine 11.

The method may then return to block 56 or may end.

FIG. 4 illustrates a flow diagram of a method of controlling the first robot 20 to collaborate with the second robot 22 within the gas turbine engine 11 according to various examples.

At block 68, the method may include controlling the sensor arrangement 18 to obtain sensed data. For example, the controller 12 may send a control signal to the sensor arrangement 18 to obtain sensed data. Where the sensor arrangement 18 includes the magnetic transmitter arrangement 34 and the first magnetic field sensor 36 mounted on the first robot 20 (for example, the first magnetic field sensor 36 may be mounted at the end of the elongate member $20_2$ adjacent the first interface 48), the controller 12 may control the magnetic transmitter arrangement 34 to emit one or more magnetic fields. Where the sensor arrangement 18 includes the second three dimensional scanner 42 (for example, the second three dimensional scanner 42 may be mounted at the end of the elongate member $22_1$ adjacent the second interface 54), the controller 12 may control an emitter of the second three dimensional scanner 42 to emit electromagnetic waves, or ultrasonic waves towards the first robot 20.

At block 70, the method includes receiving sensed data associated with the first robot 20. The sensed data is 'associated' with the first robot 20 in that the sensed data includes information that enables the controller 12 to determine the position and/or orientation of the first robot 20.

For example, where the sensor arrangement 18 includes the first magnetic field sensor 36, the controller 12 may receive sensed data associated with the first robot 20 from the first magnetic field sensor 36. In this example, the sensed data is associated with the first robot 20 in that the sensed data is generated by the first magnetic field sensor 36 that is located on the first robot 20 and therefore includes information on the position and/or orientation of the first robot 20.

By way of another example, where the sensor arrangement 18 includes the second three dimensional scanner 42, the controller 12 may receive sensed data associated with the first robot 20 from the second three dimensional scanner 42.

In this example, the sensed data is associated with the first robot 20 in that the sensed data is generated from electromagnetic waves or ultrasonic waves that are reflected from the first robot 20 and therefore includes information from which the controller 12 may determine the position and/or orientation of the first robot 20.

At block 72, the method includes determining position and/or orientation of the first robot 20 using the received sensed data. For example, where the first magnetic field sensor 36 is mounted at the end of the first robot 20 and adjacent the first interface 48, the controller 12 may use the received sensed data to determine the position and/or orientation of the end of the first robot 20. By way of another example, where the sensor arrangement 18 includes the second three dimensional scanner 42 mounted on the second robot 22, the controller 12 may use the received sensed data to determine the position and/or orientation of the first robot 20 using triangulation, time of flight, or conoscopic holography algorithms for example.

At block 74, the method includes determining an action for the first robot 20 using the determined position and/or orientation of the first robot 20. For example, an operator may use the user input device 14 to define a target location on a graphical representation of the gas turbine engine 11 displayed by the display 16 (the graphical representation may be generated from the stored data 33 of the structure of the gas turbine engine 11). The controller 12 may compare the position and/or orientation of the target location with the determined position and/or orientation of the first robot 20 to determine an action for the first robot 20.

Where the first robot 20 is not positioned at the target location, the controller 12 may determine that the first robot 20 is to move relative to the gas turbine engine 11 and towards the target location.

Where the first robot 20 is positioned close to, or at, the target location and includes a clamp connected to the first interface 48, the controller 12 may determine that the first robot 20 is to hold the aerofoil $11_3$ to prevent movement of the aerofoil $11_3$ within the gas turbine engine 11.

Where the first robot 20 is positioned close to, or at, the target location and includes a camera (such as a CCD camera or a CMOS camera), the controller 12 may determine that the camera is to be controlled to obtain one or more images of the second robot 22 and/or the gas turbine engine 11 (such as the aerofoil $11_3$).

Where the first robot 20 is positioned close to, or at, the target location and includes a machine tool, the controller 12 may determine that the machine tool is to be controlled to machine the aerofoil $11_3$ within the gas turbine engine 11.

The controller 12 may determine the action for the first robot 20 by taking into account the action being performed (or to be performed) by the second robot 22. For example, where the second robot 22 has machined the aerofoil $11_3$, the controller 12 may then determine that the aerofoil $11_3$ is to be inspected by the first robot 20.

At block 76, the method includes providing a control signal 78 to the first robot 20 to cause the first robot 20 to perform the determined action to collaborate with the second robot 22. For example, the controller 12 may generate a control signal 78 using the action determined at block 74 and then provide the control signal 78 to the first robot 20. The first controller 44 of the first robot 20 may then use the control signal 78 to control the first actuator 46 to move the first robot 20. Where the controller 12 determines at block 74 that the first robot 20 is to move and/or inspect and/or machine and/or clamp, the control signal 78 includes instructions that cause the first robot 20 to move and/or inspect and/or machine and/or clamp respectively.

It should be appreciated that the controller 12 may use the stored data 33 of the structure of the gas turbine engine 11 to generate the control signal 78. For example, the controller 12 may generate a movement control signal using the stored data 33 so that the elongate member $20_2$ of the first robot 20 moves towards the aerofoil $11_3$ and avoids collisions with other objects within the gas turbine engine 11.

The method may then return to block 68 and may end.

The apparatus 10 and the methods described in the preceding paragraphs may provide several advantages.

First, the apparatus 10 and the methods may enable two or more robots to collaborate and complete an action within the system 11. For example, the first robot 20 may be controlled to machine the aerofoil $11_3$ in the gas turbine engine 11, and the second robot 20 may be controlled to clamp the aerofoil $11_3$ and thereby reduce machining vibrations caused by the first robot 20. By way of another example, the apparatus 10 may be configured to deposit thermal barrier coatings in a combustor of a gas turbine engine. In particular, one of the first and second robots 20, 22 may be configured to cause a vacuum in the combustor, and the other of the first and second robots 20, 22 may comprise a deposition tool (for example, a plasma gun) for depositing the thermal barrier coating.

Second, since the first robot 20 and the second robot 22 are physically separate from one another, the first robot 20 and the second robot 22 may be optimally positioned relative to the system 11 to enable one or more actions to be performed by the first and second robots 20, 22. For example, the first and second bases $20_1$, $22_1$ may be positioned so that the elongate members $20_2$, $22_2$ may be inserted through any of the borescope ports $11_4$, $11_5$, $11_6$, $11_7$ to enable one or more actions (such as inspection, clamping, machining) to be performed within the gas turbine engine. This may enable the apparatus 10 to perform a relatively large number of repairs within the gas turbine engine 11. This may advantageously reduce the number of repairs that require the gas turbine engine to be removed from an aircraft and may thus reduce the cost of repairing the gas turbine engine.

It will be understood that the invention is not limited to the embodiments above-described and various modifications and improvements can be made without departing from the concepts described herein. For example, the different embodiments may take the form of an entirely hardware embodiment, an entirely software embodiment, or an embodiment containing both hardware and software elements. While the methods illustrated in FIGS. 2 and 4 have been described in relation to a gas turbine engine, it should be appreciated that the methods are applicable to any system 11 as described in the preceding paragraphs.

Except where mutually exclusive, any of the features may be employed separately or in combination with any other features and the disclosure extends to and includes all combinations and sub-combinations of one or more features described herein.

What is claimed is:

1. A computer-implemented method of controlling at least one of a first robot and a second robot to collaborate within a system, the first robot and the second robot being physically separate to one another, the method comprising:
receiving sensed data associated with the second robot;
determining at least one of a position and an orientation of the second robot using the received sensed data;
storing, in a memory, data regarding a structure of an object on which the second robot is to perform an action;
determining the action for the second robot using the stored data of the structure of the object and the at least one of the determined position and the determined orientation of the second robot;
generating a control signal based on the structure of the object and the at least one of the determined position and the determined orientation; and
providing the control signal to the second robot to cause the second robot to perform the determined action to collaborate with the first robot and avoid collisions with other objects.

2. The computer-implemented method as claimed in claim 1, wherein the sensed data is associated with a first end of the second robot, the first end comprising one or more devices for performing the determined action.

3. The computer-implemented method as claimed in claim 1, further comprising controlling a three dimensional scanner to obtain the sensed data.

4. The computer-implemented method as claimed in claim 3, wherein the three dimensional scanner is mounted on the first robot.

5. The computer-implemented method as claimed in claim 3, wherein controlling the three dimensional scanner includes: controlling an emitter to emit electromagnetic waves, the sensed data being received from an electromagnetic wave sensor.

6. The computer-implemented method as claimed in claim 3, wherein controlling the three dimensional scanner includes: controlling an ultrasonic transducer to emit ultrasonic waves, the sensed data being received from the ultrasonic transducer.

7. The computer-implemented method as claimed in claim 1, further comprising controlling a magnetic transmitter arrangement to provide one or more magnetic fields, the second robot being at least partially positioned within the one or more magnetic fields, the sensed data being received from a magnetic field sensor mounted on the second robot.

8. The computer-implemented method as claimed in claim 1, wherein the determined action includes movement relative to the system.

9. The computer-implemented method as claimed in claim 1, wherein the determined action includes holding an object within the system to prevent movement of the object within the system.

10. The computer-implemented method as claimed in claim 1, wherein the determined action includes obtaining one or more images of the first robot and/or the system.

11. The computer-implemented method as claimed in claim 1, wherein the determined action includes machining an object within the system.

12. The computer-implemented method as claimed in claim 1, further comprising: receiving sensed data associated with the first robot;
   determining position and/or orientation of the first robot using the received sensed data;
   determining an action for the first robot using the determined position and/or orientation of the first robot; and
   providing a control signal to the first robot to cause the first robot to perform the determined action to collaborate with the second robot.

13. A non-transitory computer readable storage medium comprising computer readable instructions that, when read by a computer, cause the computer to execute a method of controlling at least one of a first robot and a second robot to collaborate within a system, the first robot and the second robot being physically separate to one another, the method comprising:
   receiving sensed data associated with the second robot;
   determining at least one of a position and an orientation of the second robot using the received sensed data;
   storing, in a memory, data regarding a structure of an object on which the second robot is to perform an action;
   determining the action for the second robot using the stored data of the structure of the object and the at least one of the determined position and the determined orientation of the second robot;
   generating a control signal based on the structure of the object and the at least one of the determined position and the determined orientation; and
   providing the control signal to the second robot to cause the second robot to perform the determined action to collaborate with the first robot and avoid collisions with other objects.

14. An apparatus for controlling at least one of a first robot and a second robot to collaborate within a system, the first robot and the second robot being physically separate to one another, the apparatus comprising a controller configured to:
   receive sensed data associated with the second robot;
   determine position and/or orientation of the second robot using the received sensed data;
   determine an action for the second robot using the determined position and/or orientation of the second robot; and
   provide a control signal to the second robot to cause the second robot to perform the determined action to collaborate with the first robot.

15. The apparatus as claimed in claim 14, wherein the controller is configured to:
   receiving sensed data associated with the first robot;
   determining at least on of a position and an orientation of the first robot using the received sensed data;
   storing, in a memory, data regarding a structure of an object on which the second robot is to perform an action;
   determining the action for the first robot using the stored data of the structure of the object and the at least one of the determined position and the determined orientation of the first robot;
   generating a control signal based on the structure of the object and the at least one of the determined position and the determined orientation; and
   providing the control signal to the first robot to cause the first robot to perform the determined action to collaborate with the second robot and avoid collisions with other objects.

16. The apparatus as claimed in claim 14, further comprising: the first robot including a first controller and a first actuator; and the second robot including a second controller and a second actuator.

17. The apparatus as claimed in claim 16, wherein the first robot is a continuum robot having a first base, the first controller and the first actuator being housed within the first base, and wherein the second robot is a continuum robot having a second base, the second controller and the second actuator being housed within the second base, the first base and the second base being movable relative to one another.

18. The apparatus as claimed in claim 16, wherein the first robot and the second robot each comprise a first end having an interface for interchangeably receiving at least a first device and a second device.

19. The apparatus as claimed in claim 18, wherein the first device includes one or more of: imaging apparatus; machining apparatus; clamping apparatus, and the second device includes one or more of: imaging apparatus; machining apparatus; clamping apparatus.

* * * * *